United States Patent
Han et al.

(10) Patent No.: US 9,600,077 B2
(45) Date of Patent: Mar. 21, 2017

(54) IMAGE DISPLAY DEVICE AND METHOD FOR CONTROLLING SAME

(71) Applicant: LG ELECTRONICS INC., Seoul (KR)

(72) Inventors: Soonbo Han, Seoul (KR); Hyojin Song, Seoul (KR); Sangjo Park, Seoul (KR); Dongyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/437,726

(22) PCT Filed: Oct. 23, 2013

(86) PCT No.: PCT/KR2013/009487
§ 371 (c)(1),
(2) Date: Apr. 22, 2015

(87) PCT Pub. No.: WO2014/065595
PCT Pub. Date: May 1, 2014

(65) Prior Publication Data
US 2015/0293595 A1 Oct. 15, 2015

Related U.S. Application Data

(60) Provisional application No. 61/717,310, filed on Oct. 23, 2012.

(30) Foreign Application Priority Data

Oct. 23, 2013 (KR) ........................ 10-2013-0126785

(51) Int. Cl.
*G06F 3/14* (2006.01)
*G06F 3/01* (2006.01)

(52) U.S. Cl.
CPC ................ *G06F 3/017* (2013.01); *G06F 3/14* (2013.01)

(58) Field of Classification Search
None
See application file for complete search history.

(56) References Cited

U.S. PATENT DOCUMENTS

| 8,819,812 B1 * | 8/2014 | Weber ..................... G06F 3/017 726/18 |
| 2005/0212767 A1 | 9/2005 | Marvit et al. |
| 2014/0009378 A1 * | 1/2014 | Chew ..................... G06F 3/017 345/156 |

FOREIGN PATENT DOCUMENTS

| KR | 10-2001-0027533 A | 4/2001 |
| KR | 10-2009-0056469 A | 6/2009 |

(Continued)

OTHER PUBLICATIONS

International Search Report and Written Opinion dated Jan. 29, 2014 issued in Application No. PCT/KR2013/009487.

*Primary Examiner* — Joseph Haley
(74) *Attorney, Agent, or Firm* — KED & Associates LLP

(57) ABSTRACT

The present invention provides an image display device comprising: a sensing unit for sensing an input gesture of a user; a display unit for outputting visual information among the executed data of an application when the application is executed; a collection unit for collecting control gesture information included in the executed data; and a control unit for executing an event of the application which is included in the executed data and corresponds to the control gesture information if the control gesture information and the input gesture sensed by the sensing unit are matching while the application is executed.

10 Claims, 17 Drawing Sheets

(56) References Cited

FOREIGN PATENT DOCUMENTS

| KR | 10-2012-0034637 A | 4/2012 |
|----|-------------------|--------|
| WO | WO 2010-046541 A1 | 4/2010 |
| WO | WO 2010/129599 A1 | 11/2010 |

* cited by examiner

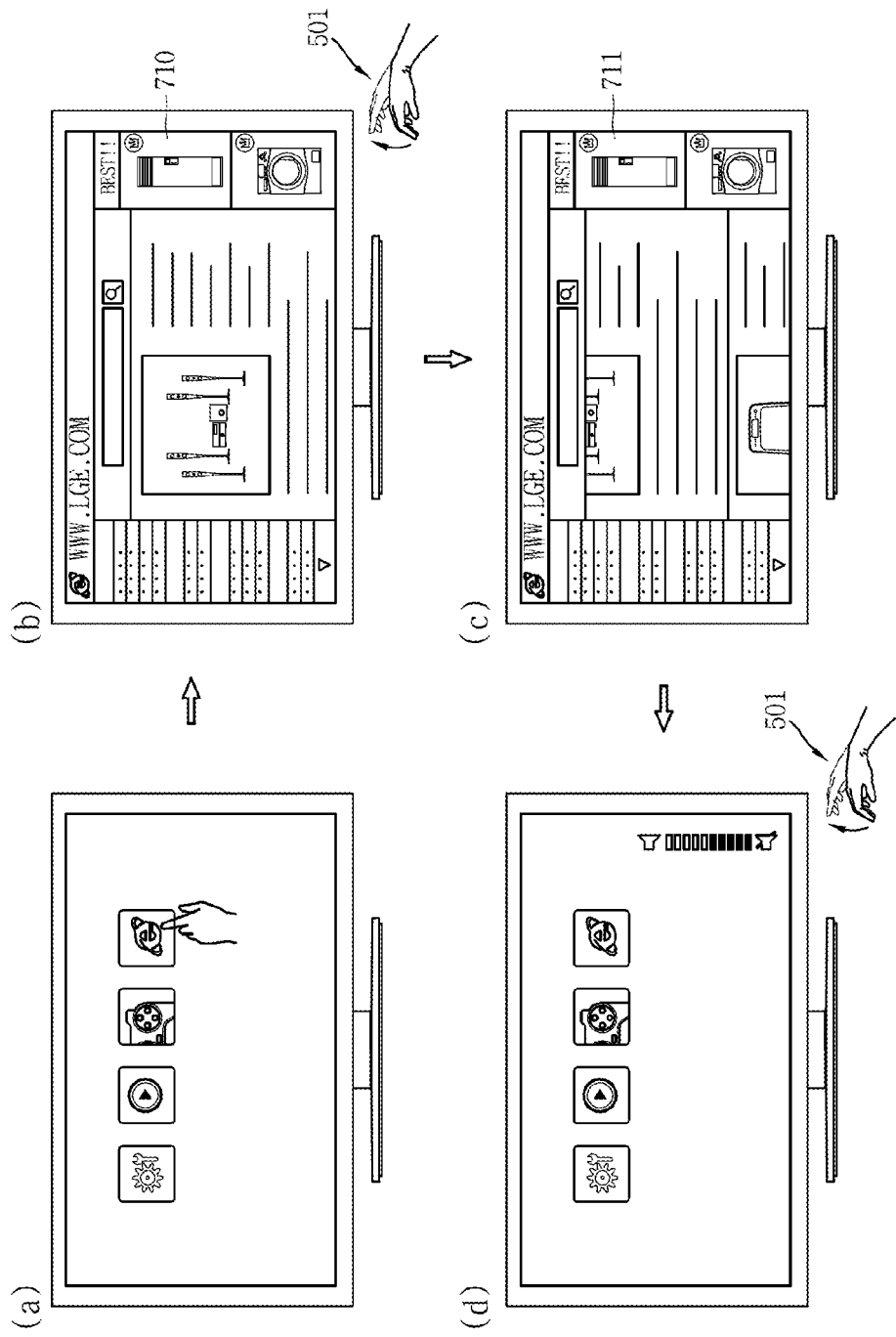

FIG. 7B

```
// initialize a gesture event listener
// gml.xml contains a set of Gesture Markup Languages
var g = new CustomGestureEvent("gml.xml"); // gml.xml has 'flick' event and 'rotate' event in GML var obj = document.getElementById("obj");
obj.addEventListner("flick", function(e) { ... });

g.stop();   // stop the listener temporarily for performance
g.resume(); // resume the stopped listener
g.remove(); // remove the listener
```

FIG. 9A

```xml
<?xml version="1.0"?>
<event id="triangle">
  <condition>
    <match>
      <statement tolerance="0.3" duration="500">
          dist(hand[0].m[t].end.pos, hand[0].m[t-2].start.pos) == 0
      </statement>
    </match>
  </condition>
  <return>
   <item>
      <name>speed</name>
      <value>duration</value>
   </item>
<item>
      <name>size</name>
      <value>hand[0].m[t].length</value>
   </item>
  </return>
</event>
```

IMAGE DISPLAY DEVICE AND METHOD FOR CONTROLLING SAME

CROSS-REFERENCE TO RELATED PATENT APPLICATIONS

This application is a U.S. National Stage Application under 35 U.S.C. §371 of PCT Application No. PCT/KR2013/009487, filed Oct. 23, 2013, which claims priority to prior U.S. Provisional Application No. 61/717,310 filed Oct. 23, 2012 and Korean Patent Application No. 10-2013-0126785, filed Oct. 23, 2013, whose entire disclosures are incorporated herein by reference.

TECHNICAL FIELD

The present disclosure relates to an image display device controllable by using a gesture.

BACKGROUND ART

An image display device includes all of devices which receive and display broadcast, or recording and reproducing videos, and devices for recording and reproducing audio. The image display device includes a television, a computer monitor, a projector, a tablet and the like, for example.

As it becomes multifunctional, an image display device can be allowed to capture still images or moving images, play games, receive broadcast and the like, so as to be implemented as an integrated multimedia player. In addition, the image display device has currently been implemented into a smart device (for example, smart television). Accordingly, the image display device can selectively use screen information (screen image) displayed thereon in a manner of accessing an Internet or cooperating with a mobile terminal or a computer. For example, the image display device may utilized a screen image displayed thereon in a manner of capturing or storing it to store in a memory or storing it by other output methods.

In recent time, a technique of controlling functions based on a user's gesture sensed is under development. Here, one image display device can sense a predefined gesture and thus execute only a function within a limited range.

As the image display device becomes multifunctional and executable applications increase, there are limitations on the control of applications using gestures.

DISCLOSURE OF THE INVENTION

Therefore, to obviate those problems, an aspect of the detailed description is to provide an image display device, which is controllable by an independent gesture optimized for an application.

To achieve these and other advantages and in accordance with the purpose of the present invention, as embodied and broadly described herein, there is provided an image display device including a sensing unit that is configured to sense a user's input gesture, a display unit that is configured to output visual information among executed data of an application when the application is executed, a collection unit that is configured to collect control gesture information included in the executed data, and a controller that is configured to execute an event of the application which is included in the executed data and corresponds to the control gesture information when the control gesture information and the input gesture sensed by the sensing unit match each other while the application is executed.

In accordance with one embodiment of the present invention, the controller may include an extractor that is configured to extract an element forming the input gesture, a tracker that is configured to track a moving trajectory of the extracted element, and a matching unit that is configured to compare an input gesture with the control gesture information, the input gesture defined by the element and the moving trajectory of the element.

In accordance with one embodiment of the present invention, the control gesture information may include text, and a control signal associated with the event. The text may include at least one of the number of the element, a moving direction of the element, distance information between a plurality of elements, a moving time of the element, and a moving shape (pattern) of the element.

In accordance with one embodiment of the present invention, the control gesture information may include a preset condition corresponding to a control command for deactivating or reactivating a sensing operation of the input gesture.

In accordance with one embodiment of the present invention, the control gesture information may include a preset condition to ignore the input gesture.

In accordance with one embodiment of the present invention, the extractor may extract the element based on text forming the collected control gesture information.

In accordance with one embodiment of the present invention, the controller may stop the matching between the input gesture and the control gesture information when the application is terminated.

In accordance with one embodiment of the present invention, the controller may generate a preset control command to correspond to the input gesture based on the input gesture when the application is terminated.

To achieve these and other advantages and in accordance with the purpose of the present invention, as embodied and broadly described herein, there is provided a method for controlling an image display device according to another exemplary embodiment disclosed herein, the method including sensing a user's input gesture, receiving executed data of an application when the application is executed, collecting control gesture information corresponding to an event of the application among the executed data, comparing the control gesture information with the input gesture while the application is executed, and generating the event when the control gesture information and the input gesture match each other.

In accordance with one embodiment of the present invention, the comparing of the control gesture information with the input gesture while the application is executed may include extracting elements of the input gesture, tracking tracks (or movements) of the elements, and sensing a change in a distance between the elements.

Advantageous Effect

In accordance with the detailed description, an image display device can be controlled using a different gesture according to an application executed. Accordingly, an application developer can apply a gesture suitable for a type of the application.

Also, control gesture information for controlling an application may include conditions for determining an input gesture more accurately, which may enable a gesture control with more improved quality. Also, if unnecessary, the gesture control can be restricted using those conditions.

BRIEF DESCRIPTION OF THE DRAWINGS

FIG. 6B is a conceptual view illustrating the control method of FIG. 6A in accordance with one exemplary embodiment.

FIG. 7B is a view illustrating gesture information including condition information in accordance with one exemplary embodiment.

FIG. 9A is a view illustrating control gesture information including information related to speed in accordance with one exemplary embodiment.

MODES FOR CARRYING OUT THE PREFERRED EMBODIMENTS

Figure 1:
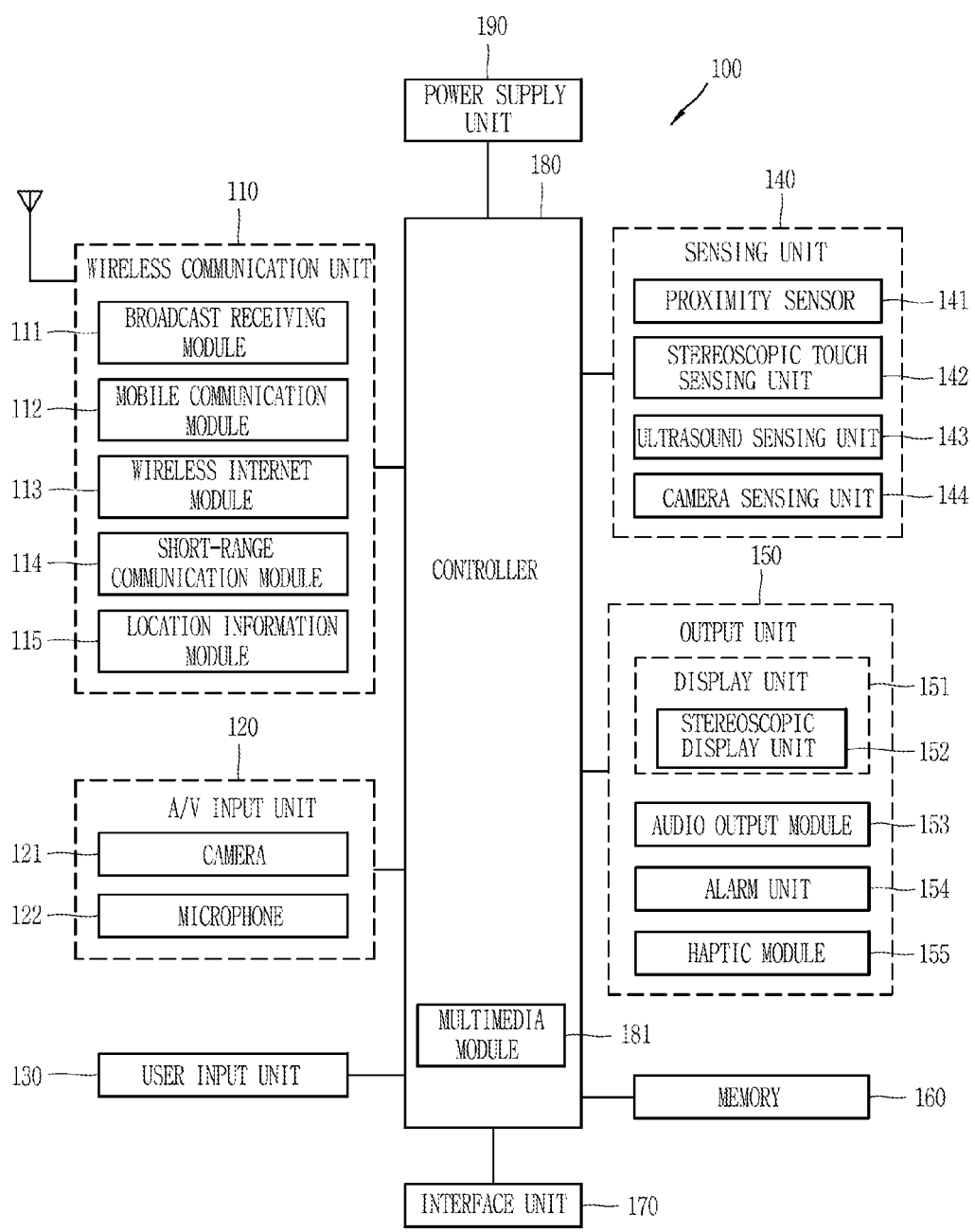
FIG. 1 is a block diagram of a terminal in accordance with one exemplary embodiment disclosed herein.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, and the like. By way of non-limiting example only, further description will be made with reference to particular types of terminals. However, such teachings apply equally to other types of terminals, such as those types noted above. In addition, these teachings may also be applied to stationary terminals such as digital TV, desktop computers, and the like.

FIG. 1A is a block diagram of a terminal in accordance with one exemplary embodiment of the present invention.

The terminal 100 may be shown having components such as a wireless communication unit 110, an audio/video (A/V) input unit 120, a user input unit 130, a sensing unit 140, an output unit 150, a memory 160, an interface unit 170, a controller 180, and a power supply unit 190. It may be understood that implementing all of the illustrated components is not a requirement, and that greater or fewer components may alternatively be implemented.

Hereinafter, each component will be described in a sequential manner.

The wireless communication unit 110 may include one or more modules which permit wireless communications between the terminal 100 and a wireless communication system, communications between the terminal 100 and a network in which the terminal 100 is located.

The wireless communication unit 110 may include one or more of a broadcast receiving module 111, a mobile communication module 112, a wireless Internet module 113, a short-range communication module 114, and a location information module 115.

The broadcast receiving module 111 receives a broadcast signal and/or broadcast associated information from an external broadcast managing entity via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of a digital multimedia broadcasting (DMB) system, an electronic service guide (ESG) of a digital video broadcast-handheld (DVB-H) system, and the like.

The broadcast receiving module 111 may receive a digital broadcast by using a digital broadcast system such as a multimedia broadcasting-terrestrial (DMB-T) system, a digital multimedia broadcasting-satellite (DMB-S) system, a data broadcasting system such as media forward link only (MediaFLO®), a digital video broadcast-handheld (DVB-H) system, integrated services digital broadcast-terrestrial (ISDB-T), etc. The broadcast receiving module 111 may be configured to be suitable for additional broadcast systems that provide a broadcast signal as well as the above-mentioned digital broadcast systems.

Broadcast signals and/or broadcast-associated information received via the broadcast receiving module 111 may be stored in the memory 160.

The mobile communication module 112 may transmit/receive wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The mobile communication module 112 may implement a video (telephony) call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless internet module 113 may support wireless Internet access for the terminal. This module may be internally or externally coupled to the mobile terminal. Examples of such wireless Internet access may include Wireless LAN (WLAN), Wi-Fi, Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, Near Field Communication (NFC) and the like.

The location information module 115 denotes a module for detecting or calculating a position of the terminal. An example of the location information module 115 may include a Global Position System (GPS) module or a WiFi module.

Referring to FIG. 1, the NV input unit 120 is configured to provide audio or video signal input to the terminal. The NV input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Position information related to a user and the like may be extracted from the image frame obtained from the camera 121. Two or more cameras 121 may be provided according to the configuration of the terminal.

The microphone 122 may receive an external audio signal via a microphone while the terminal is in a particular mode, such as a phone call mode, a recording mode, a voice recognition mode, or the like. This audio signal is processed into electric audio data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the terminal. The user input unit 130 may include a keypad, a dome switch, a touchpad (e.g., static pressure/capacitance), a jog wheel, a jog switch and the like.

The sensing unit 140 may provide status measurements of various aspects of the terminal. For instance, the sensing unit 140 may detect an open/close status of the terminal, a change in a location of the terminal 100, a presence or absence of user contact with the terminal 100, the location of the terminal 100, acceleration/deceleration of the terminal 100, and the like, so as to generate a sensing signal for controlling the operation of the terminal 100. For example, regarding a slide-type terminal, the sensing unit 140 may sense whether a sliding portion of the terminal is open or closed. Other examples include sensing functions, such as the sensing unit 140 sensing the presence or absence of power provided by the power supply 190, the presence or absence of a coupling or other connection between the interface unit 170 and an external device, and the like.

The output unit 150 is configured to output an audio signal, a video signal or an alarm signal. The output unit 150 may include a display 151, an audio output module 153, an alarm 155, and the like.

The display unit 151 may output information processed in the terminal 100. For example, when the terminal is operating in a phone call mode, the display unit 151 may provide a User Interface (UI) or a Graphic User Interface (GUI), which includes information associated with the call. As another example, if the terminal is in a video call mode or a capture mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display and the like.

Some of such displays may be implemented as a transparent type or an optical transparent type through which the exterior is visible, which is referred to as a transparent display. A representative example of the transparent display may include a Transparent OLED (TOLED), or the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the terminal 100. For instance, a plurality of the display units 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image. The 3D stereoscopic image refers to an image making a viewer feel that a gradual depth and reality of an object on a monitor or a screen is the same as a realistic space. The 3D stereoscopic image may be implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, may include Wheatstone stereoscopic scheme, or the like.

The auto-stereoscopic scheme may include, for example, a parallax barrier scheme, a lenticular scheme, an integral imaging scheme, a switchable lens, or the like. The projection scheme may include a reflective holographic scheme, a transmissive holographic scheme, and the like.

In general, a 3D stereoscopic image may be comprised of a left image (a left eye image) and a right image (a right eye image). According to how left and right images are combined into a 3D stereoscopic image, a 3D stereoscopic imaging method may be divided into a top-down method in which left and right images are disposed up and down in a frame, an L-to-R (left-to-right or side by side) method in which left and right images are disposed left and right in a frame, a checker board method in which fragments of left and right images are disposed in a tile form, an interlaced method in which left and right images are alternately disposed by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined to generate a single 3D thumbnail image. In general, thumbnail refers to a reduced image or a reduced still image. The thusly generated left image thumbnail and the right image thumbnail may be displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as 'touch sensor') have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched.

Still referring to FIG. 1, a proximity sensor 141 may be arranged at an inner region of the terminal covered by the touch screen, or near the touch screen. The proximity sensor 141 may be provided as one example of the sensing unit 140. The proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position will correspond to a position where the pointer faces perpendicular to the touch screen upon the proximity touch of the pointer.

The proximity sensor 141 may sense proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as a 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 may detect the distance between a sensing object (for example, the user's finger or a stylus pen), applying a touch by using the force of electromagnetism or infrared rays without a mechanical contact, and a detect surface. By using the distance, the terminal may recognize which portion of a stereoscopic image has been touched. In particular, when the touch screen is an electrostatic touch screen, the degree of proximity of the sensing object may be detected based on a change of an electric field according to proximity of the sensing object, and a touch to the 3D image may be recognized by using the degree of proximity.

The stereoscopic touch sensing unit 142 may be configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 may be configured to recognize position information relating to the sensing object by using ultrasonic waves.

The ultrasonic sensing unit 143 may include, for example, an optical sensor and a plurality of ultrasonic sensors. The optical sensor may be configured to sense light and the ultrasonic sensors may be configured to sense ultrasonic waves. Since light is much faster than ultrasonic waves, a time for which the light reaches the optical sensor may be much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 may include at least one of the camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor may be configured to scan a movement of the sensing object in proximity to the touch screen. In more detail, the photo sensor may include photo diodes and transistors (TRs) at rows and columns to scan content mounted on the photo sensor by using an electrical signal changing according to the quantity of applied light. Namely, the photo sensor may calculate the coordinates of the sensing object according to variation of light to thus obtain position information of the sensing object.

The audio output module 153 may output audio data received from the wireless communication unit 110 or stored in the memory 160 in a call signal reception mode, a call mode, a record mode, a voice recognition mode, a broadcast reception mode, and the like. Also, the audio output module 153 may provide audible output signals related to a particular function (e.g., a call signal reception sound, a message reception sound, etc.) performed by the terminal 100. The audio output module 153 may include a receiver, a speaker, a buzzer or the like.

The alarm unit 154 may output a signal for informing about an occurrence of an event of the terminal 100. Events generated in the terminal, for example, may include call signal reception, message reception, key signal inputs, a touch input, etc. In addition to video or audio signals, the alarm unit 154 may output signals in a different manner, for example, using vibration to inform of an occurrence of an event. The video or audio signals may also be output via the display unit 151 and the audio output module 153. Hence, the display unit 151 and the audio output module 153 may be classified as parts of the alarm unit 154.

A haptic module 155 may generate various tactile effects that user may feel. A typical example of the tactile effect generated by the haptic module 155 is vibration. Strength, pattern and the like of the vibration generated by the haptic module 155 may be controllable by a user selection or setting of the controller. For example, different vibrations may be combined to be outputted or sequentially outputted.

Besides vibration, the haptic module 155 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 155 may be implemented to allow the user to feel a tactile effect through a muscle sensation such as the user's fingers or arm, as well as transferring the tactile effect through a direct contact. Two or more haptic modules 155 may be provided according to the configuration of the terminal 100.

The memory 160 may store programs used for operations performed by the controller, or may temporarily store input and/or output data (for example, a phonebook, messages, still images, video, etc.). In addition, the memory 160 may store data regarding various patterns of vibrations and audio signals output when a touch input is sensed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the terminal 100 may be operated in relation to a web storage device that performs the storage function of the memory 160 over the Internet.

The interface unit 170 may serve as an interface with every external device connected with the terminal 100. For example, the interface unit 170 may receive data transmitted from an external device, receive power to transfer to each element within the terminal 100, or transmit internal data of the terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the terminal 100 is connected with an external cradle, the interface unit 170 may serve as a passage to allow power from the cradle to be supplied to the terminal 100 therethrough or may serve as a passage to allow various command signals input by the user from the cradle to be transferred to the terminal therethrough. Various command signals or power input from the cradle may operate as signals for recognizing that the terminal is properly mounted on the cradle.

The controller 180 may typically control the general operations of the terminal 100. For example, the controller 180 may perform controlling and processing associated with voice calls, data communications, video calls, and the like. The controller 180 may include a multimedia module 181 for playbacking multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images, respectively.

Also, the controller 180 may execute a lock state to restrict a user from inputting control commands for applications when a state of the terminal meets a preset condition. Also, the controller 180 may control a lock screen displayed in the lock state based on a touch input sensed on the display unit 151 in the lock state of the terminal.

The power supply unit 190 may receive external power or internal power and supply appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2:
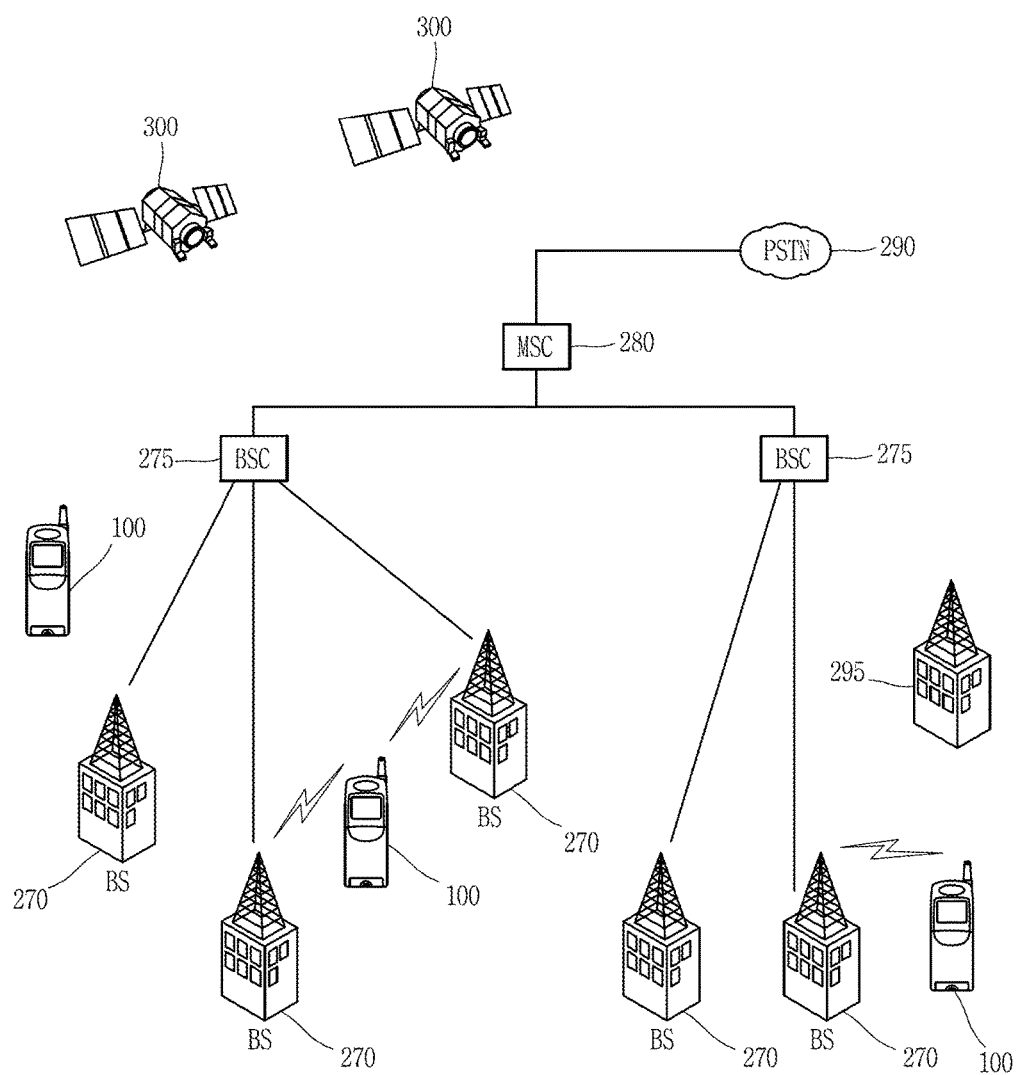
FIGS. 2 and 3 are conceptual views of a communication system operable with a terminal in accordance with the present invention.

Hereinafter, description will be given of a communication system operable with a terminal according to the present disclosure. FIGS. 2A and 2B are conceptual views of a communication system operable with a terminal 100 disclosed herein.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the terminals 100 operating within the system. The broadcast receiving module 111 (FIG. 1) is typically configured inside the terminal 100 to receive broadcast signals transmitted by the BT 295.

Referring to FIG. 2A, a broadcasting transmitter (BT) 295 may transmit a broadcast signal to terminals operating within the system. The broadcasting reception module 111 illustrated in FIG. 1 may be provided in the terminal for receiving the broadcasting signal transmitted from the BT 295.

FIG. 2A further depicts several Global Positioning System (GPS) satellites 300. Such satellites 300 facilitate locating the position of at least one of plural terminals 100. Two satellites are depicted in FIG. 2A, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various terminals 100. The terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the terminals 100.

Hereinafter, description will be given of a method for obtaining location information on a terminal using a wireless fidelity (WiFi) positioning system (WPS) with reference to FIG. 2B.

The WiFi positioning system (WPS) 300 refers to a location determination technology based on a wireless local area network (WLAN) using WiFi as a technology for tracking the location of the terminal 100 using a WiFi module provided in the terminal 100 and a wireless access point (AP) 320 for transmitting and receiving to and from the WiFi module.

The WiFi positioning system 300 may include a WiFi location determination server 310, a terminal 100, a wireless access point (AP) 320 connected to the terminal 100, and a database 330 stored with any wireless AP information.

The WiFi location determination server 310 may extract the information of the wireless AP 320 connected to the terminal 100 based on a location information request message (or signal) of the terminal 100. Information related to the wireless AP 320 may be transmitted to the WiFi location determination server 310 through the terminal 100 or transmitted to the WiFi location determination server 310 from the wireless AP 320.

The information related to the wireless AP extracted based on the location information request message of the terminal 100 may be at least one of MAC address, SSID, RSSI, channel information, privacy, network type, signal strength and noise strength.

The WiFi location determination server 310 may receive the information of the wireless AP 320 connected to the terminal 100 as described above, and compare the received wireless AP 320 information with information contained in the pre-established database 330 to extract (or analyze) the location information of the terminal 100.

On the other hand, referring to FIG. 2B, as an example, wireless APs connected to the terminal 100 are illustrated as first, second, and third wireless APs 320. However, the number of wireless APs connected to the terminal 100 may be changed in various ways according to a wireless communication environment in which the terminal 100 is located. When the terminal 100 is connected to at least one of wireless APs, the WiFi positioning system 300 can track the location of the terminal 100.

Next, considering the database 330 stored with any wireless AP information in more detail, various information related to any wireless APs disposed at different locations may be stored in the database 330.

The information related to any wireless APs stored in the database 330 may be information such as MAC address, SSID, RSSI, channel information, privacy, network type, latitude and longitude coordinates of the wireless AP, building at which the wireless AP is located, floor number, detailed indoor location information (GPS coordinates available), AP owner's address, phone number, and the like.

In this manner, any wireless AP information and location information corresponding to the any wireless AP may be stored together in the database 330, and thus the WiFi location determination server 310 may retrieve wireless AP information corresponding to the information related to the wireless AP 320 connected to the terminal 100 from the database 330 and extract the location information matched to the retrieved wireless AP, thereby extracting the location information of the terminal 100.

Figure 3:
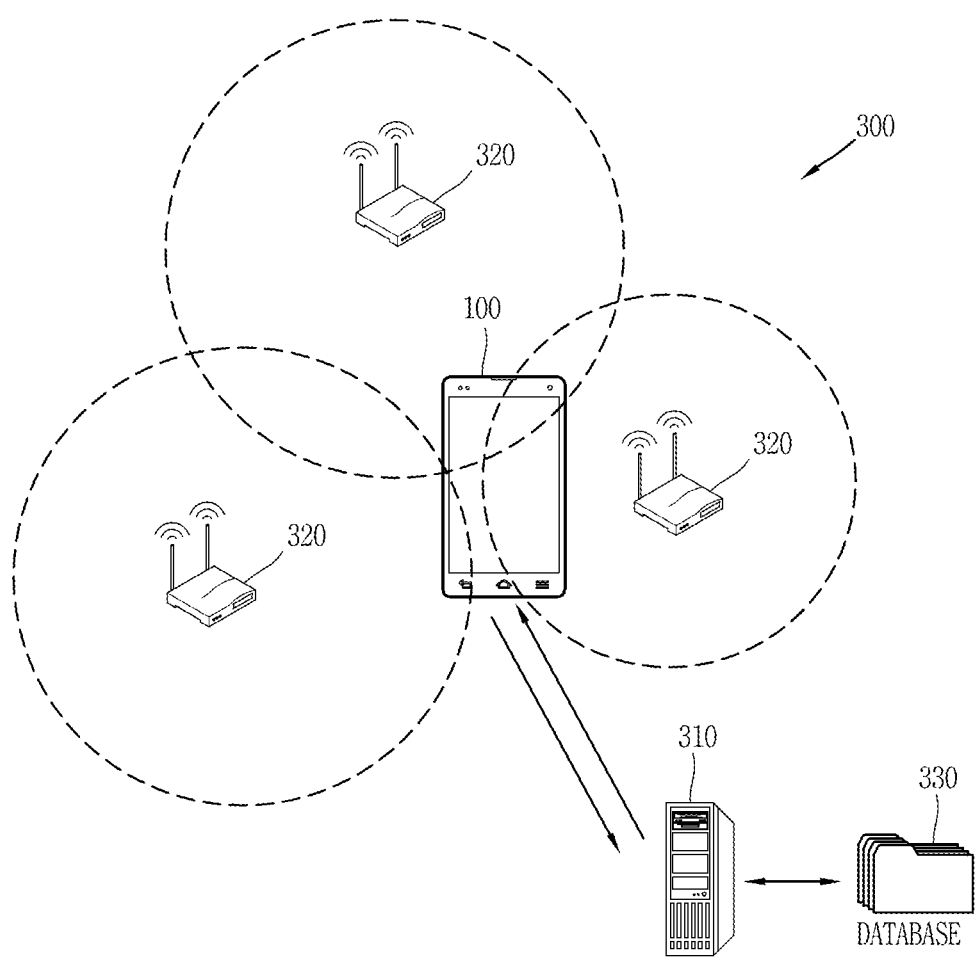

FIG. 3A is a front perspective view of one example of a terminal 100 in accordance with the present invention.

The terminal 100 is described with reference to a bar-type terminal body. However, the terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

A body includes a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102. A battery cover 103 obscuring a battery 191 may be detachably coupled to the rear case 102.

The cases may be formed by injection-molding synthetic resin or may be formed of a metal, for example, stainless steel (STS), aluminum (Al), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the terminal 100. The display unit 151 may visually output information by including at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may include a touch sensing element to receive a control command by a touch method. When a touch is made to any one place on the display unit 151, the touch sensing element may be configured to sense this touch and enter the content corresponding to the touched place. The content entered by a touch method may be a text or numerical value, or a menu item which can be indicated or designated in various modes.

The touch sensing element may be formed with transparency to allow visual information displayed on the display unit 151 to be seen, and may include a structure for enhancing visibility of a touch screen at bright places. Referring to FIG. 3A, the display unit 151 occupies a most portion of the front surface of the front case 101.

The first audio output unit 153a and the first camera 121a may be disposed in a region adjacent to one of both ends of the display unit 151, and the first manipulation input unit 131 and the microphone 122 may be disposed in a region adjacent to the other end thereof. The second manipulation interface 132 (refer to FIG. 3B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the terminal 100. However, the present disclosure may not be limited to this, but a hole for releasing the sounds may be formed on a window.

The first camera 121a may process video frames such as still or moving images obtained by the image sensor in a video call mode or a capture mode. The processed video frames may be displayed on the display unit 151.

The user input unit 130 may be manipulated by a user to input a command for controlling the operation of the terminal 100. The user input unit 130 may include first and second manipulation units 131 and 132. The first and the second manipulation units 131 and 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a push key.

The content received by the first and/or second manipulation units 131 and 132 may be set in various ways. For example, the first manipulation unit 131 may be used by the user to input a command such as menu, home key, cancel, search, or the like, and the second manipulation unit 132 may be used by the user to input a command, such as controlling a volume level being output from the first audio output module 153*a*, switching into a touch recognition mode of the display unit 151, or the like.

The microphone 122 may be formed to receive the user's voice, other sounds, and the like. The microphone 122 may be provided at a plurality of places, and configured to receive stereo sounds.

The interface unit 170 may serve as a path allowing the terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), or a power supply terminal for supplying power to the terminal 100. The interface unit 170 may be implemented in the form of a socket for accommodating an external card, such as Subscriber Identification Module (SIM), User Identity Module (UIM), or a memory card for information storage.

FIG. 3B is a rear perspective view of the terminal 100 illustrated in FIG. 3A.

Referring to FIG. 3B, a second camera 121*b* may be further mounted at a rear surface of the terminal body, namely, the rear case 102. The second camera 121*b* may have an image capturing direction, which is substantially opposite to the direction of the first camera unit 121*a* (refer to FIG. 3A), and have a different number of pixels from that of the first camera unit 121*a*.

For example, it may be preferable that the first camera 121*a* has a smaller number of pixels to capture an image of the user's face and transmits such image to another party, and the camera 221' has a larger number of pixels to capture an image of a general object and not immediately transmits it in most cases. The first and the second cameras 121*a* and 121*b* may be installed on the terminal body such that they can be rotatable or popped up.

Furthermore, a flash 123 and a mirror 124 may be additionally disposed adjacent to the second camera 121*b*. When an image of a subject is captured with the camera 121*b*, the flash 123 may illuminate the subject. The mirror 124 may allow the user to see himself or herself when he or she wants to capture his or her own image (i.e., self-image capturing) by using the camera 121*b*.

A second audio output unit 153*b* may be further disposed on the rear surface of the terminal body. The second audio output module 153*b* may implement stereophonic sound functions in conjunction with the first audio output module 153*a* (refer to FIG. 3A), and may be also used for implementing a speaker phone mode for call communication.

An antenna (not shown) for receiving broadcast signals may be additionally disposed on a lateral surface of the terminal body in addition to an antenna for making a phone call or the like. The antenna constituting a part of the broadcast receiving module 111 (refer to FIG. 1) may be provided in the terminal body in a retractable manner.

A power supply unit 190 (refer to FIG. 1) for supplying power to the terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Furthermore, the extracted location information of the terminal 100 may be transmitted to the terminal 100 through the WiFi location determination server 310, thereby acquiring the location information of the terminal 100.

According to the present invention, the terminal may perform a function of searching for information related to a user-input search word using a communication system and the wireless communication unit 110. For example, the terminal may search for user-desired information from information stored in the memory 160 or information related to an input search word from information existing on a web.

The controller controls the display unit to output the searched information. According to the present invention, the controller may control the display unit to output the searched information by arranging the information according to a preset layout.

Figure 4A:
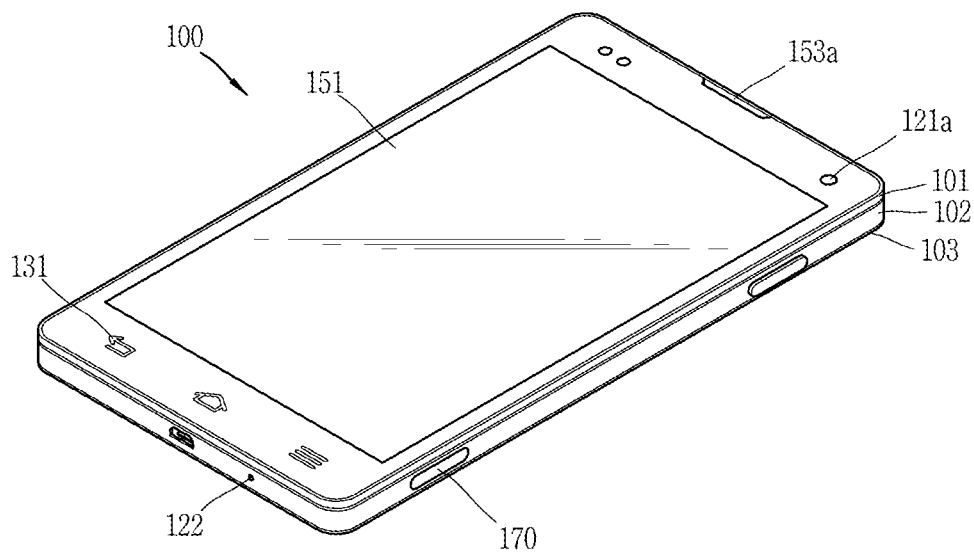
FIG. 4A is a front perspective view of one example of a terminal in accordance with the present invention.

Meanwhile, a terminal according to the present invention may include an image display device for outputting an image as well as a portable terminal. FIG. 4A is a block diagram illustrating an internal structure of an image display device in accordance with one exemplary embodiment disclosed herein, and FIG. 4B is a conceptual view illustrating an image display device in accordance with one exemplary embodiment disclosed herein.

Figure 4B:
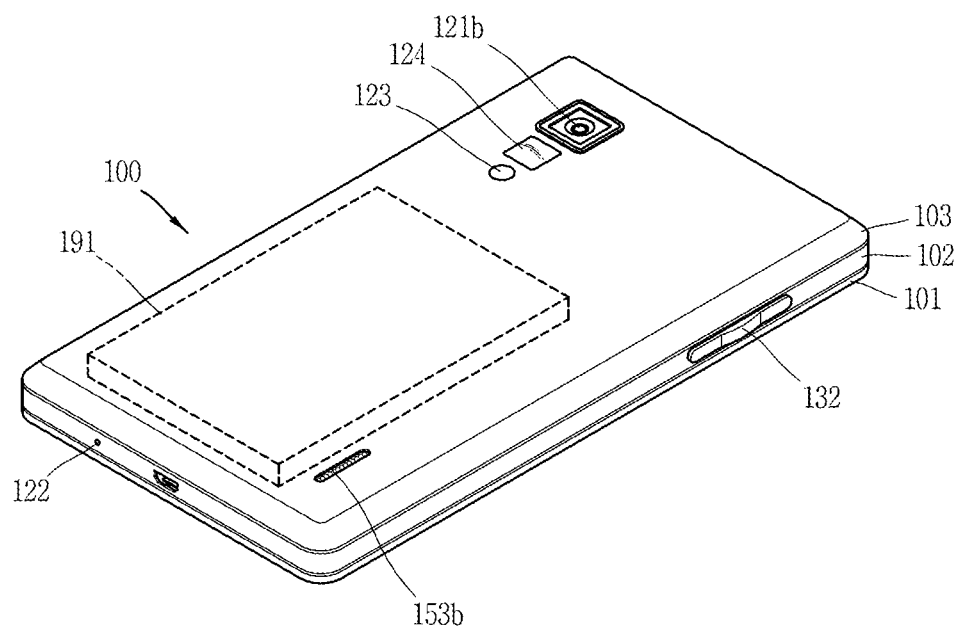
FIG. 4B is a rear perspective view of the terminal illustrated in FIG. 4A.
Figure 4C:
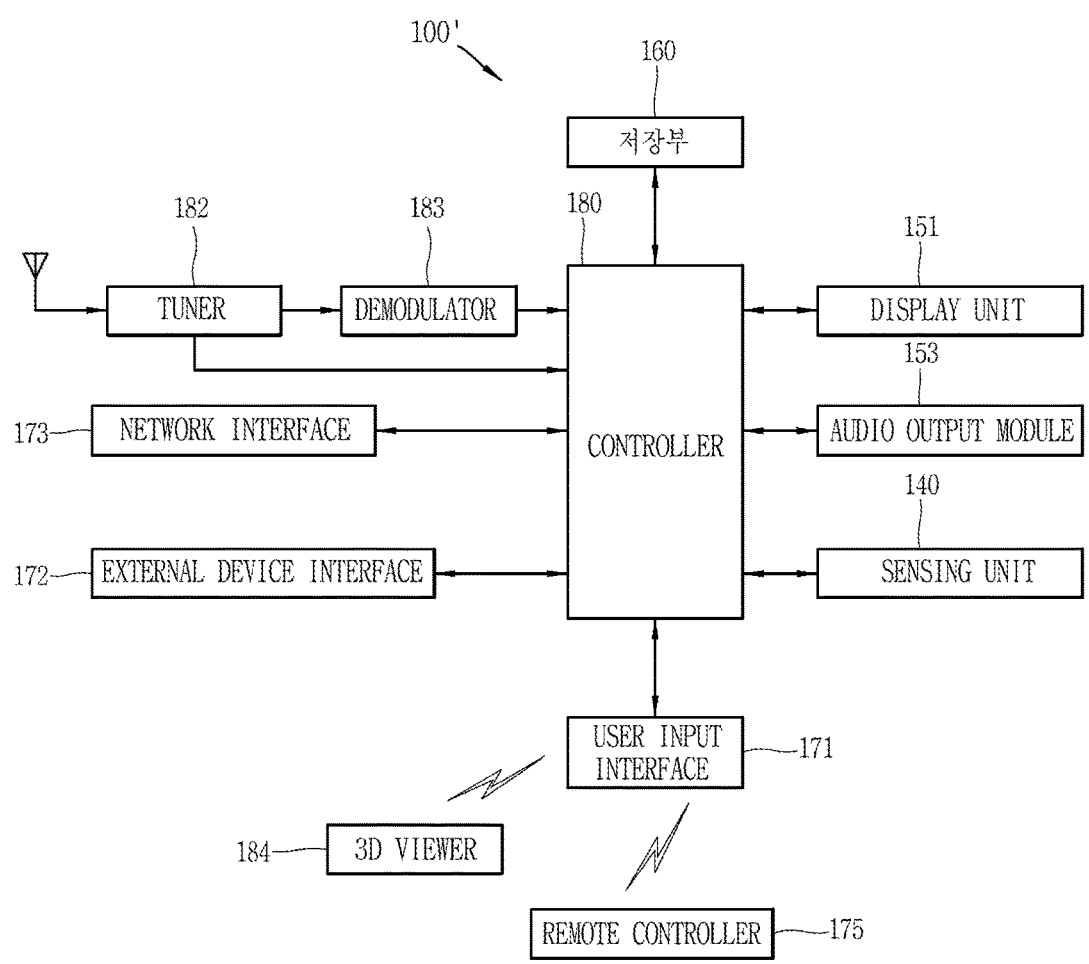
FIG. 4C is a block diagram illustrating an internal structure of an image display device in accordance with one exemplary embodiment disclosed herein.
Figure 4D:
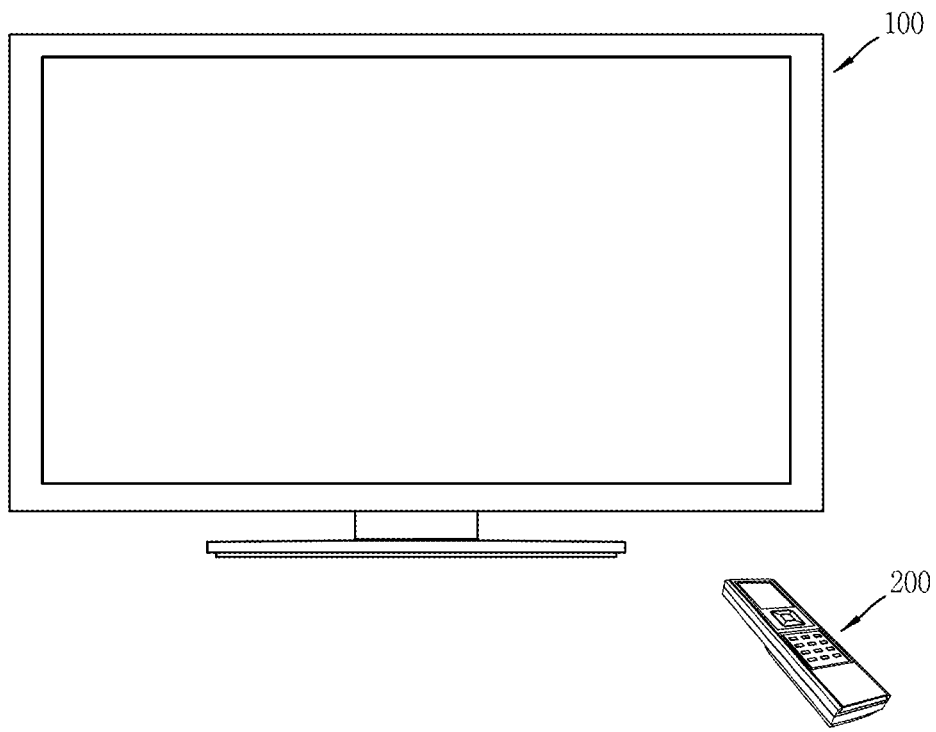
FIG. 4D is a conceptual view illustrating an image display device in accordance with one exemplary embodiment disclosed herein.

Referring to FIGS. 1, 4A and 4B, an image display device 100' may include a tuner 182, a demodulator 183, an external device interface 172, a network interface 173, a storage unit (or a memory) 160, a user input interface 171, a sensor unit (not illustrated), a controller 180, a display unit 151', an audio output module 153, and a 3D viewer 184. The tuner 182 selects a radio frequency (RF) broadcast signal corresponding to a user-selected channel or all previously saved channels from RF broadcast signals received via an antenna. Also, the tuner 182 converts the selected RF broadcast signal into an intermediate frequency signal or a baseband video or audio signal.

For example, when the selected RF broadcast signal is a digital broadcast signal, the tuner 182 may convert the RF broadcast signal into a digital IF signal (DIF). On the other hand, when the RF broadcast signal is an analog broadcast signal, the tuner 182 may convert the RF broadcast signal into an analog baseband video or audio signal (CVBS/SIF). That is, the tuner 182 may process the digital broadcast signal or the analog broadcast signal. The analog baseband video or audio signal (CVBS/SIF) may be input directly to the controller 180.

Also, the tuner 182 may receive an RF broadcast signal of a single carrier by advanced television system committee (ATSC) or RF broadcast signal of multi-carrier by digital video broadcasting (DVB).

Meanwhile, the tuner 182 may sequentially select RF broadcast signals of all broadcast channels, which are saved by a channel memory function, from RF broadcast signals received via an antenna and may then convert the selected RF broadcast signals to intermediate frequency signals or baseband video or audio signals.

The tuner 182 may be provided in plurality to receive broadcast signals of a plurality of channels. Or, a single tuner may also be provided to simultaneously receive broadcast signals of a plurality of channels.

The demodulator 183 receives the digital IF signal (DIF) converted by the tuner 182 and then performs a demodulation operation on the received signal (DIF). For instance, if the digital IF signal outputted from the tuner 182 follows ATSC, the demodulator 183 performs 8-VSB (8-vestigal side band) demodulation, for example. Moreover, the demodulator 183 may perform channel decoding as well. To this end, the demodulator 183 may include a trellis decoder, a de-interleaver, a Reed-Solomon decoder and the like and may be able to perform trellis decoding, de-interleaving and Reed-Solomon decoding.

For example, if the digital IF signal outputted from the tuner 182 follows DVB, the demodulator 183 may perform coded orthogonal frequency division modulation (COFDMA), for example. And, the demodulator 183 may perform channel decoding. To this end, the demodulator 183 may include a convolution decoder, a de-interleaver, a Reed-Solomon decoder and the like and may perform convolution decoding, de-interleaving and Reed-Solomon decoding. The demodulator 183 may perform demodulation and channel decoding and may then output a stream signal (TS). In doing so, the stream signal may include a multiplexed signal of a video signal, an audio signal or a data signal. For instance, the stream signal may include MPEG-2 transport stream (TS) in which MPEG-2 video signal, Dolby AC-3 audio signal and the like are multiplexed with each other. In particular, the MPEG-2 TS may include a 4-byte header and 184-byte payload.

Meanwhile, the demodulator 183 may be separately provided in accordance with ATSC or DVB. In particular, the demodulator 183 may include an ATSC demodulator and a DVB demodulator.

The stream signal outputted from the demodulator 183 may be input to the controller (control unit) 180. The controller 180 performs demultiplexing, video/audio signal processing and the like. The controller 180 then outputs video and audio to the display unit 151' and the audio output module 153, respectively.

The external device interface 172 may perform data transmission or reception with a connected external device 190. To this end, the external device interface 172 may include an A/V input/output unit (not illustrated) or a wireless communication unit (not illustrated). The external device interface 172 may be connected in a wired/wireless manner with the external device 190 such as a digital versatile disk (DVD) player, a Blu-ray player, a game player, a camera, a camcorder, a computer (e.g., laptop, etc.) and the like. The external device interface 172 delivers a video, audio or data signal, which is externally inputted via the connected external device 190, to the controller 180 of the image display device 100. And, the external device interface 172 may be able to output a video, audio or data signal processed by the controller 180 to the connected external device. To this end, the external device interface 172 may include an A/V input/output unit (not illustrated) or a wireless communication unit (not illustrated).

In order to enable video and audio signals of an external device to the image display device 100, the NV input/output unit may include a USB terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal and the like.

The wireless communication unit may be able to perform short range wireless communications with other electronic devices. The image display device 100 may be connected with other electronic devices via network by communication standards such as Bluetooth, radio frequency identification (RFID), infrared data association (IrDA), ultra wideband (UWB), ZigBee, digital living network alliance (DLNA) and the like.

The external device interface 172 may be connected to various set-top boxes via at least one of the above-described terminals to enable input/output operations with the connected set-top boxes. Meanwhile, the external device interface 172 may perform data transmission or reception with a 3D viewer 184. The network interface 173 provides an interface for connecting the image display device 100 to a wired/wireless network including an Internet network. The network interface 173 may include an Ethernet terminal and the like for an access to the wired network. For the access to the wireless network, the network interface 173 may use communication standards such as wireless LAN (WLAN) (Wi-Fi), wireless broadband (WiBro), world interoperability for microwave access (WiMax), high speed downlink packet access (HSPDA) and the like for example.

The network interface 173 may receive contents or data provided by an Internet or contents provider or a network operator via a network. That is, the network interface 173 may receive contents, such as a movie, an advertisement, a game, a video on demand (VOD), a broadcast signal and the like provided by the Internet or contents provider, and related information via a network. The network interface 173 may also receive update information related to firmware and update files provided by the network operator. Also, the network interface 173 may transmit data to the Internet or contents provider or the network operator.

Also, the network interface 173 may be connected to, for example, an Internet protocol (IP) TV, so as to receive a video, audio or data signal processed in an IPTV set-top box and transfer it to the controller 180 to allow bi-directional communication. The network interface 173 may also transfer signals processed in the controller 180 to the IPTV set-top box.

The IPTV may indicate ADSL-TV, VDSL-TV, FTTH-TV or the like or indicate TV over DSL, Video over DSL, TV overiP (TVIP), Broadband TV (BTV) or the like, according to a type of transmission network. Also, the IPTV may indicate an Internet-accessible Internet TV, and a full-browsing TV.

The memory 160 may store programs for signal processing and control by the controller 180, and also store processed video, audio or data signals.

The memory 160 may execute a function of temporarily storing a video, audio or data signal input via the external device interface 172. Also, the memory 160 may store information related to a predetermined broadcast channel through a channel memory function of a channel map and the like.

The memory 160 may include at least one storage medium of a flash memory-type storage medium, a hard disc-type storage medium, a multimedia card micro-type storage medium, a card-type memory (for example, SD or XD memory), a random access memory (RAM), a read-only memory (ROM) (e.g., electrically erasable programmable ROM (EEPROM)), and the like.

The image display device 100 may reproduce a file (a video file, a still image file, a music file, a document file, etc.) stored in the memory 160 to provide to a user.

FIG. 1 illustrates an exemplary embodiment having the memory 160, separate from the controller 180. However, the memory 160 may alternatively be configured to be included in the controller 180. The user input interface 171 may transfer a user-input signal to the controller 180 or a signal from the controller 180 to the user. For example, the user input interface 171 may receive a user input signal, such as a power on/off, a channel selection, a screen setting and the like from the remote controller 200, or transmit a signal from the controller to the remote controller 200, according to various communication standards, such as RF communication, IR communication and the like.

The user input interface 171, for example, may also transfer a user input signal, which is inputted from a local key (not shown), such as a power key, a channel key, a volume key, or a setting key, to the controller 180, for example. The sensing unit 140 may sense a user's position or a user's gesture or touch or a position of the 3D viewer 184. To this end, the sensing unit 140 may include a touch sensor, a voice sensor, a position sensor, a motion sensor, gyro sensor, and the like.

The sensed user's position, user's gesture or touch or the position of the 3D viewer 184 may be input to the controller 180, or unlike the drawing, may be input to the controller 180 via the user input interface 171.

The controller 180 may demultiplex stream, which is input via the tuner 182, the demodulator 183 or the external device interface 172 or process the demultiplexed signals, to generate and output signals for outputting video or audio.

The video signal processed in the controller 180 may be input to the display unit 151' to be output as an image (video) corresponding to the video signal. Also, the video signal processed in the controller 180 may be input to an external output device through the external device interface 172.

The audio signal processed in the controller 180 may be output to the audio output module 153. The audio signal processed in the controller 180 may be input to an external output device through the external device interface 172.

Besides, the controller 180 may control an overall operation of the image display device 100. For example, the controller 180 may control the tuner 182 to select an RF broadcast corresponding to a user-selected channel or a prestored channel.

Also, the controller 180 may control the image display device 100 by a user command input via the user input interface 171 or an internal program. For example, the controller 180 may control the tuner 182 to input a signal of a channel, which is selected in response to a predetermined channel select command received via the user input interface 171. The controller 180 may then process a video, audio or data signal of the selected channel. The controller 180 may control information related to the user-selected channel to be output through the display unit 151' or the audio output module 153 together with the processed video or audio signal.

As another example, the controller 180 may control the display unit 151' or the audio output module 153 to output a video signal or an audio signal, which is input from an external device, for example, a camera or a camcorder through the external device interface 172 in response to an external device image reproduce command received through the user input interface 171.

In the meantime, the controller 180 may control the display unit 151' to display an image. For example, the controller 180 may control the display unit 151 to output a broadcast image input through the tuner 182, an externally input image input through the external device interface 172, an image input through the network interface 173, or an image stored in the memory 160.

Here, the image output on the display unit 151' may be a still image or a video, and a 2D or 3D image.

The controller 180 may allow a predetermined object within the image displayed on the display unit 151' to be generated and displayed as a 3D object. For example, the object may be at least one of an accessed web screen (a newspaper, a journal, etc.), an electronic program guide (EPG), various menus, a widget, an icon, a still image, a video, and text. The 3D object may be processed to have a different depth from the image displayed on the display unit 151'. Preferably, the 3D object may be processed to seem to protrude more than the image displayed on the display unit 151'.

In the meantime, the controller 180 recognizes a user's location based on an image captured by the capturing element (not illustrated). For example, the controller 180 may recognize a distance (z-axial coordinates) between the user and the image display device 100. Also, the controller 180 may recognize x-axial coordinates and y-axial coordinates within the image display device 100 corresponding to the user's location.

The controller 180 may perform signal processing to enable viewing of a corresponding image according to a viewer. For example, when the sensing unit or a capturing element (not illustrated) senses a presence, an operation or non-operation or the number of a viewer 195, the controller 180 may perform signal processing for pairing with the viewer 195. That is, the controller 180 may control the image display device 100 to output a pairing signal on the viewer 184 and receive a response signal from the viewer 195.

The controller 180, in the meantime, may control the tuner 182 to receive a broadcast video according to the sensed number of viewers 195. For instance, when three viewers are sensed, the controller 180 controls the tuner 182 having a plurality of tuners to receive broadcast videos of different channels. And, the controller 180 may synchronize the broadcast videos with the viewers, respectively, such that each broadcast signal can be displayed at a different time.

The controller 180 may also receive an externally input image according to the sensed number of viewers. For example, when three viewers are sensed, the controller 180 may control the viewers to receive a broadcast video, an externally input video from an optical device such as DVD and an externally input video from a PC, respectively. The controller 180 may synchronize the input videos with the viewers, respectively, such that each video (broadcast video, DVD video, PC video) can be displayed at a different time.

Meanwhile, every time when the number of viewers sensed increases while displaying videos, the controller 180 may control the corresponding videos in a manner of increasing a vertical synchronization frequency Vsync of each displayed video. For example, while a first video and a second video are displayed with being synchronized with a first viewer and a second 3D viewer, respectively, for $\frac{1}{60}$ seconds, when a third viewer is used, the controller 180 may control first to third videos to be synchronized and displayed on the first to third viewers, respectively, for $\frac{1}{60}$ seconds. That is, while the first video and the second video are displayed at a vertical synchronization frequency of 120 Hz, the controller 180 may control the first to third videos to be displayed at a vertical synchronization frequency increased up to 180 Hz.

The controller 180 may differently set a viewable video search object, for example, a channel search object of a broadcast video, based on each viewer. For example, the controller 180 may set a different channel search object on the basis of an age, such as an adult and a child, so as to search for a different object when searching for a channel.

Besides, the controller 180 may also provide such channel search object, based on a taste, a sex, a recently-viewed channel or a program grade.

Meanwhile, when the same video is selected by a first viewer and a second viewer, the controller 180 may control a message indicating a duplicate selection to be notified. The message may be displayed in an object form on the display unit 151', or transmitted to each viewer as a wireless signal.

Although not illustrated, the image display device 100 may further include a channel browsing processor, which generates a thumbnail image corresponding to a channel signal or an externally input signal. The channel browsing processor may receive a stream signal (TS) output from the demodulator 183 or a stream signal output from the external device interface 172, and generate a thumbnail image by extracting an image from the input stream signal. The generated thumbnail image may be input to the controller 180 as it is or by being encoded. Also, the generated thumbnail image may also be input to the controller 180 by being encoded into a stream form.

The controller 180 may control the display unit 151' to display a thumbnail list including a plurality of thumbnail images, using an input thumbnail image. The thumbnail list may be displayed in a brief viewing manner in which the list is displayed on a partial region while a predetermined image is output on the display unit 151', or displayed in a fully viewing manner in which the list is displayed on most regions of the display unit 151'. Thumbnail images in the thumbnail list may be sequentially updated.

The display unit 151' may generate a driving signal by converting a video signal, a data signal, an OSD signal and a control signal processed in the controller 180, or a video signal, a data signal and a control signal received via the external device interface 172.

The display unit 151' may be a PDP, an LCD, an OLED, a flexible display 151' and the like, and also be implemented as a 3D display 151'. To view the 3D image, the display unit 151' may be classified into an additional displaying method and an independent displaying method. The independent displaying method may be configured such that the 3D image can be implemented solely by the display unit 151' without an additional display unit, for example, glasses or the like. Various technologies such as a lenticular technology, a parallax barrier technology and the like may be applied as the independent displaying method.

The additional displaying method may be configured to implement the 3D image by using an additional display unit, namely, the 3D viewer 184 in addition to the display unit 151'. As one example, various methods such as a head mount display (HMD) type, a glass type and the like may be applied.

The glass type may be classified into a passive glass type such as a polarized glass type and the like, and an active glass type such as a shutter glass type and the like. The HMD type may also be classified into a passive HMD type and an active HMD type.

The 3D viewer 184 may be a 3D glass type for viewing a stereoscopic image therethrough. The 3D glass type 195 may include a passive polarized glass or an active shutter glass, and is described as a concept including the head mount type.

The display unit 151' may be configured as a touch screen so as to be used as an input device as well as an output device. The audio output module 153 may output sound by receiving a signal processed in the controller 180, for example, a stereo signal, a 3.1 channel signal or a 5.1 channel signal. The audio output module 185 may be implemented as various types of speakers.

Figure 5:
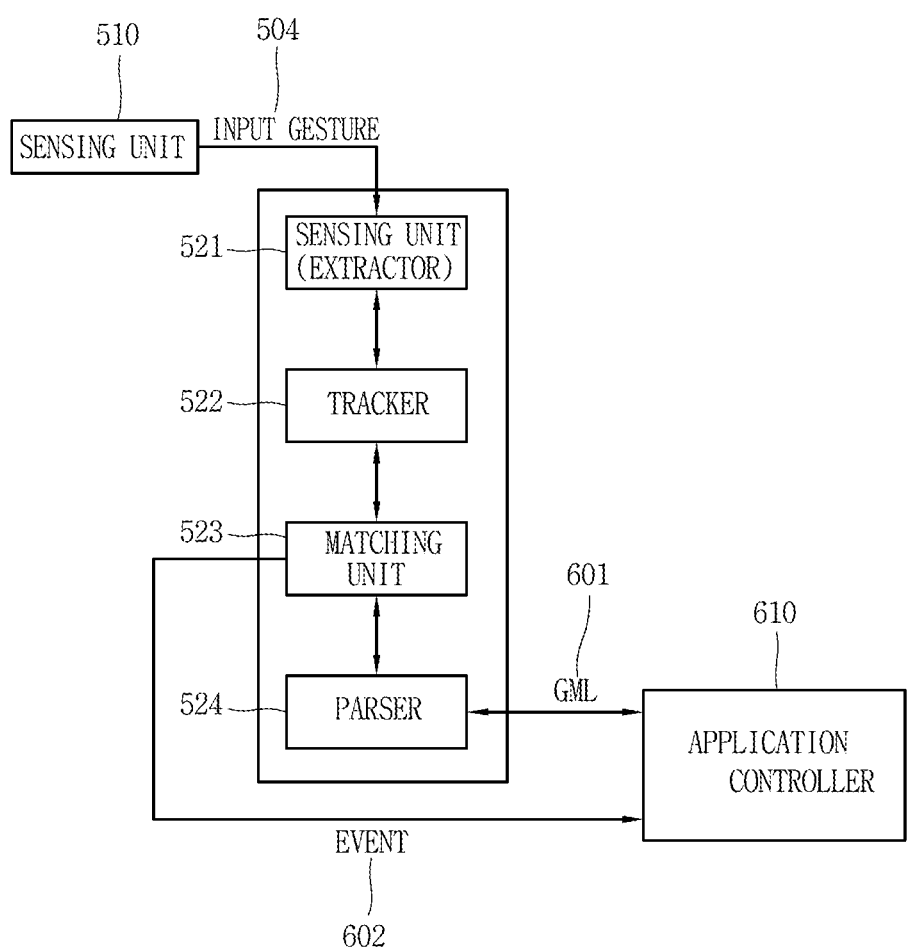
FIG. 5 is a block diagram illustrating components of a gesture engine for controlling an application based on a gesture in accordance with one exemplary embodiment.
Figure 6A:
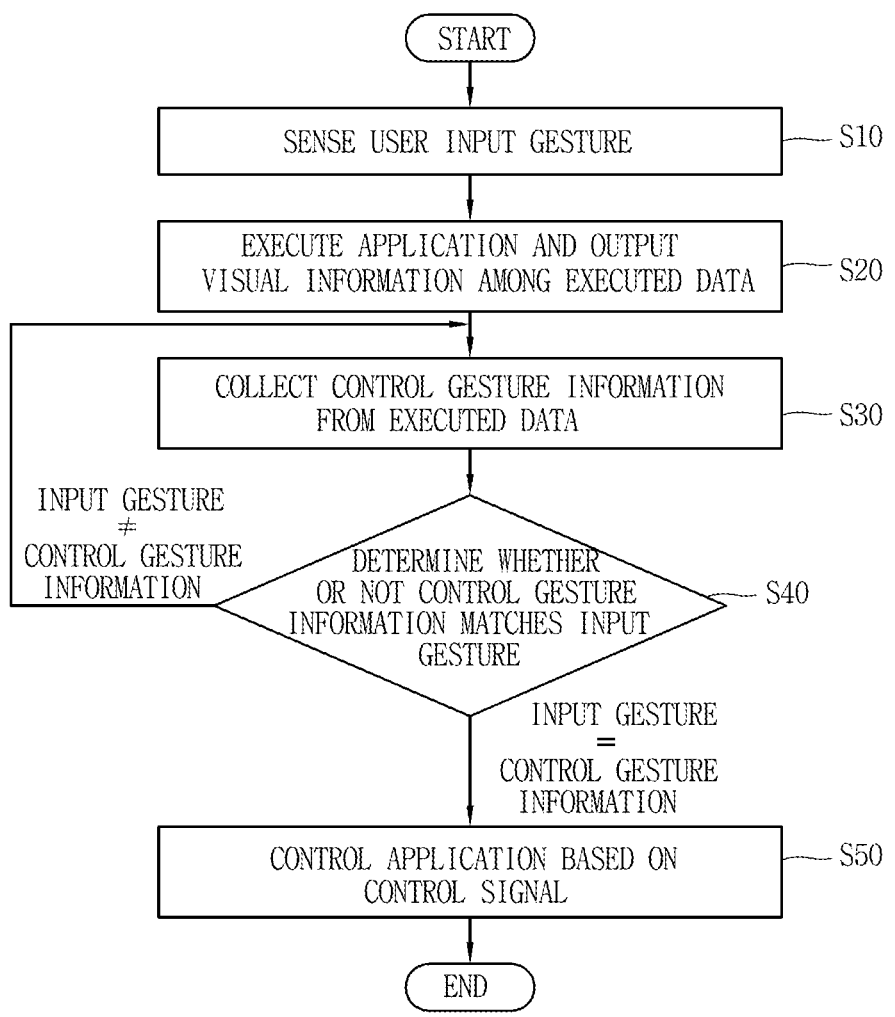
FIG. 6A is a flowchart illustrating a control method for an application based on a gesture in accordance with one exemplary embodiment.

FIG. 5 is a block diagram illustrating components of a gesture engine for controlling an application based on a gesture in accordance with one exemplary embodiment, and FIG. 6A is a flowchart illustrating a method of controlling an application based on a gesture in accordance with one exemplary embodiment.

The gesture engine 520 may include an extractor 521, a tracker 522, a matching unit 523 and a parser 524. The gesture engine 520 generates an event 602 of a preset application, in response to an input gesture 501 sensed by a sensing unit 510.

The sensing unit 510 senses a user's gesture at an outside of the image display device 100 (50). Here, the user's gesture may correspond to a specific shape or motion made using a user's body or a user's hand. Here, the sensing unit 510 may sense a shape or motion of a preset object as well as a part of the user's body. The sensing unit 510 may be implemented as a camera and the like, and configured to instantaneously image a part of the user's body or capture a moving image for a preset time.

When the application is executed, visual information among executed data of the application is output on the display unit 151 (S20). The application is executed in response to a user-applied control command or according to a preset condition. Also, the execution may include an activated state of an application whose execution screen is output on the display unit among a plurality of different applications which are currently executed. That is, the visual information corresponds to the execution screen of the application.

A collection unit collects control gesture information 601 (S30). Here, the control gesture information 601 may be referred to as gesture markup language (GML). The control gesture information 601 includes a control signal for generating an event for controlling the application, and text indicating a gesture to be compared with the sensed input gesture.

The control gesture information 601 (GML) is defined by a developer of each application, and the parser 524 parses the control gesture information 601 provided from each application. The GML is a language which defines or prescribes a gesture, and an XML language or a Javascript language may be used to define the gesture. The GML is text and the parser 524 parses the GML.

In particular, the parser 524 is configured to perform a lexical analysis step of splitting the text into tokens, and a syntactic analysis step of constructing the tokens into a preset tree form by a grammar.

That is, the developer of the application defines the gesture as text which can be split into tokens. The parser 524 of the gesture engine which has received the GML analyzes the GML. That is, the gesture engine performs analyzing a gesture indicated by a unique GML of each application.

The gesture engine 510 compares the input gesture with the control gesture information (S40).

The gesture engine 520 receives the input gesture 501 from the sensing unit 510, and receives the control gesture information 601 including the executed data of the application from an application controller 600.

The extractor 521 extracts elements of the input gesture 501. The extractor 521 may analyze the control gesture information 601, and extract necessary elements from the input gesture 501 captured by the sensing unit. For example, when the control gesture information 601 includes text indicating a circular motion of a finger, the extractor 521 may extract information related to a shape of the finger and a motion of the finger from the input gesture 501. That is, the extractor 521 extracts necessary elements from the input gesture 601 based on the text forming the control gesture information 601.

The tracker 522 tracks moving trajectories of the extracted elements. The tracker 522 may track the moving trajectories of the elements based on the extracted elements and text indicating trajectories included in the control gesture information 601. For example, based on text indicating a movement (motion) in a circular shape, the tracker 522 may track a trajectory similar to the circular shape among the moving trajectories of the various elements. That is, the tracker 522 may track trajectories of elements each forming a curved trajectory while the plurality of elements move. The tracker 522 may record the moving trajectories of the elements to define the user's gesture.

Also, the driving order of the extractor 521 and the tracker 522 may not be limited to this. For example, before the extractor 521 extracts elements based on the text, the tracker 522 may track the trajectory in response to an input gesture sensed by the sensing unit 510.

The parser 524 may change the control gesture information 601, which has been received from the application controller 600, into a suitable matching language. The matching unit 523 compares the control gesture information 601 changed by the parser 524 with the input gesture 501 (S40).

The matching unit 523 determines whether or not the information related to the elements and trajectories of the input gesture 501 obtained by the extractor 521 and the tracker 522 matches the control gesture information 601. Here, the matching between the input gesture 501 and the control gesture information 601 may be determined by whether or not the sensed input gesture 501 is represented by the text included in the control gesture information 601. That is, when the information related to each element of the input gesture and a trajectory of each element substantially corresponds to the control gesture information, the matching unit 523 may determine that the control gesture information 501 matches the input gesture 501.

When the input gesture 501 and the control gesture information 601 match each other, the matching unit 523 generates an event 602 corresponding to the control gesture information 601 (S50). That is, the application controller 600 may be controlled by the event included in the control gesture information 601. In other words, the controller 180 controls the application based on a control signal which is included in the control gesture information and matches the input gesture.

For example, the matching unit 523 transfers matching information between the input gesture 501 and the control gesture information 601 or a control signal included in the event 602.

Meanwhile, when non-matching between the input gesture 501 and the control gesture information 601 is determined, the matching unit 523 compares another input gesture 501 with the control gesture information 601.

Here, the application may be controlled by an input of another control command as well as the event included in the control gesture information 601.

The sensing unit 510 preferably continuously senses the user's gesture while the application is executed. Also, the extractor 521 and the matching unit 523 may continuously extract and track elements of the continuously sensed input gesture 501, respectively, and control the memory 160 to record analysis results of the input gesture 501.

When the input gesture 501 and the control gesture information 601 do not match each other, the matching unit 523 may receive data related to another input gesture from the memory 160.

FIG. 6B is a conceptual view illustrating the control method of FIG. 6A. The sensing unit 510 senses an input gesture (S10). The sensing unit 510 may sense the user's input gesture even when an application has not been executed.

When the application is executed, the controller 180 controls the display unit 151 to output visual information 710 among executed data of the application (S20). The sensing unit 510 senses the input gesture 501 while the application is executed.

For example, when the user moves one finger from bottom to top, the sensing unit 510 senses a shape of the finger and a moving trajectory of the finger. Control gesture information included in the executed data of the application may correspond to a control signal which enlarges visual information. When the control gesture information includes text corresponding to a motion that one finger moves upward, the controller 180 may control the display unit 151 to convert the visual information 710 into enlarged visual information 711.

Although not illustrated, when the motion of the user's finger does not match the control gesture information, the sensed input gesture may be ignored.

(d) of FIG. 6B illustrates the display unit on which the application has been terminated and the visual information 711 has been changed into another screen information. When the application is terminated, the gesture engine stops the collection of the control gesture information on the application which has been collected. Also, even if an input gesture is sensed by the sensing unit, the gesture engine may not perform matching the input gesture with the control gesture information.

For example, even when the execution of the application is stopped, the gesture engine may include unique gesture information corresponding to a control signal for controlling the image display device.

For example, when an input gesture 501 that one finger of the user's hand moves upward after the application is deactivated, the matching between the control gesture information on the application and the input gesture may be stopped, and the input gesture may then be compared with the unique gesture information.

That is, even when substantially the same input gesture is sensed by the sensing unit, the image display device may be controlled by a different method. For example, the controller 180 may adjust a volume of output sounds in response to an operation of moving up the user's one finger.

Accordingly, while the application is executed, the user may control the application using an input gesture applied to the application. Also, when the application is deactivated, the input gesture may not be applied any more. This may prevent confusion with the control method for the very image display device using the unique gesture.

Hereinafter, different control methods applied to different applications will be described with reference to FIG. 6C. As illustrated in (a) and (b) of FIG. 6C, the display unit 151 outputs first visual information 720 relating to a first application. While the first application is executed, the gesture engine receives control gesture information included in executed data of the first application. The matching unit 523 compares the sensed input gesture 501 with the control gesture information, and if matched, controls the first application.

Figure 6C:
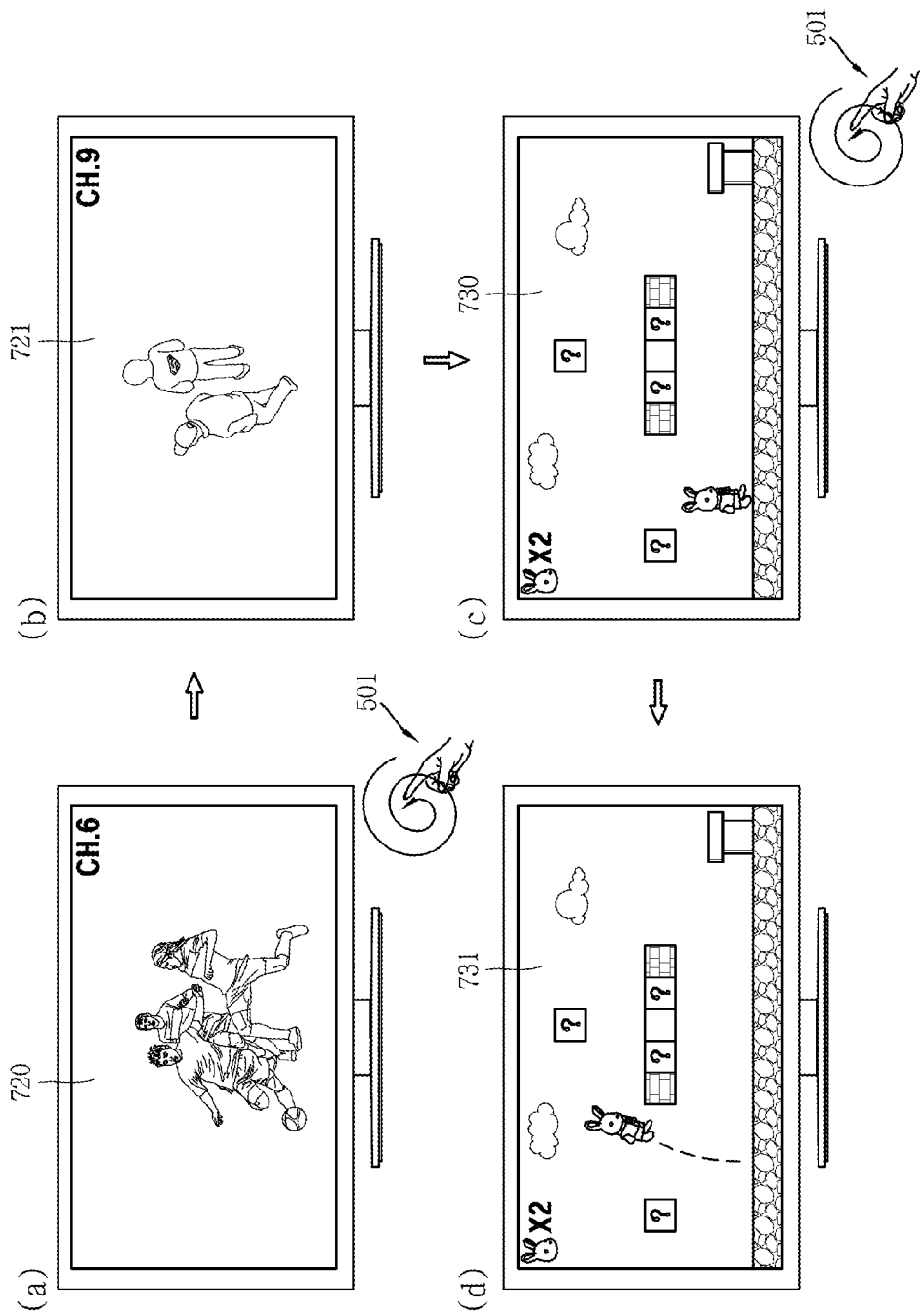
FIG. 6C is a conceptual view illustrating the control method of FIG. 6A in accordance with another exemplary embodiment.

As illustrated in (a) and (b) of FIG. 6C, the sensing unit senses an input gesture that the user's finger moves with drawing a spiral shape. The gesture engine determines whether or not the input gesture 501 corresponds to a control signal for changing a channel. When the input gesture 501 is determined to match the control gesture information by the matching unit 523, the controller 180 controls the display unit to output another screen information 721 by changing the channel.

(c) and (d) of FIG. 6C are conceptual views illustrating a control method for the image display device based on the input gesture when the first application is executed. A second application differs from the first application, and is activated when the first application is closed or after the first application is switched into a deactivated state. The display unit 151 outputs second visual information 730 on the second application.

While the second application is executed, the sensing unit 510 senses the input gesture 501. The input gesture 501 of (c) of FIG. 6C and the input gesture 501 of (b) of FIG. 6C are substantially the same as each other. For example, the input gestures illustrated in the drawings, respectively, may have substantially the same shape and moving trajectory of the user's finger.

The gesture engine receives control gesture information for controlling the second application, among executed data of the second application. The matching unit 523 of the gesture engine compares the gesture information received with the input gesture. The controller can control the image display device based on the different control signal, due to substantially the same input gesture.

Referring to (c) and (d) of FIG. 6C, the controller 180 controls the display unit 151 to move some images of a game using the input gesture 501.

That is, referring to FIG. 6C, when substantially the same input gesture is input, different control signals are applied to the first and second applications different from each other. That is, executed data of each application may include a different control signal corresponding to substantially the same input gesture.

Accordingly, each application may include information related to a unique gesture for generating a control signal, and this may be controlled to be applicable only when the application is in an activated state.

Figure 7A:
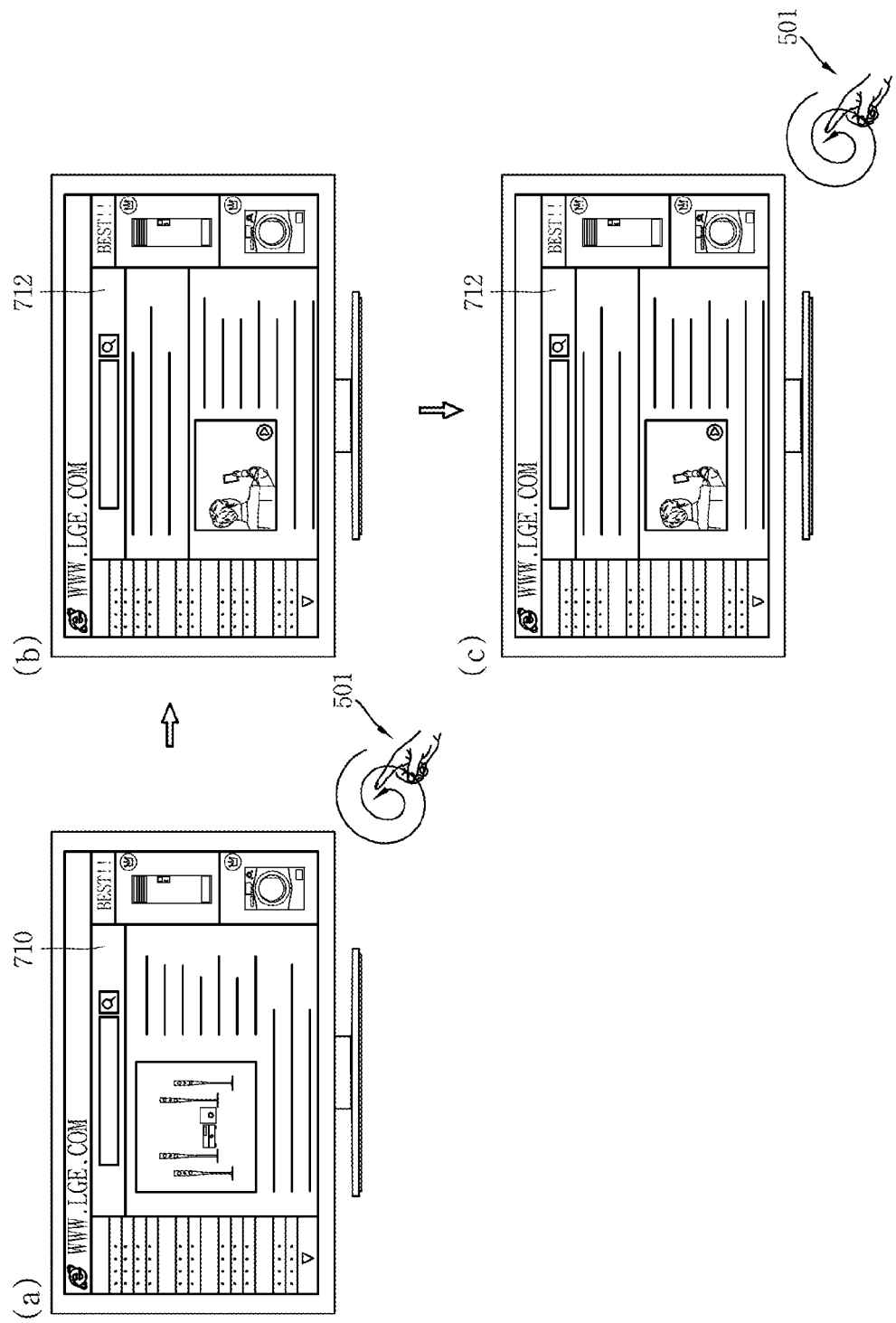
FIG. 7A is a conceptual view illustrating a method for controlling an image display device using control gesture information including conditions.

FIG. 7A is a conceptual view illustrating a method for controlling an image display device using control gesture information including a condition, and FIG. 7B is a view illustrating gesture information including condition information in accordance with one exemplary embodiment.

First, referring to FIG. 7B, control gesture information includes 'flick' event or 'rotate' event, and includes texts indicating an execution of 'flick' function. Also, the control gesture information includes text relating to a condition which indicates an end or stop of a control by gesture.

For example, the control gesture information may include, but not limited to, at least one of a condition that a control by a gesture is stopped when a reception of an input gesture is temporarily stopped for performing a function, a condition that the control is also resumed when the reception of the input gesture is resumed, and a condition that the control is also removed when the input gesture is removed.

Referring to (a) and (b) of FIG. 7A, the controller 180 controls the display unit 151 to convert the visual information 710 into another visual information 712 in response to the input gesture 501.

For example, when a currently-reproduced video is included in the another visual information 712, the controller 180 may control the sensing unit 150 to be deactivated. In this instance, the input gesture sensing function of the sensing unit 150 is stopped. According to the condition of FIG. 7B, the controller 180 stops the control by the gesture. Therefore, even though the input gesture 501 is applied, the controller 180 may ignore it.

Based on the condition included in the control gesture information, the operation of the gesture engine for generating a control signal may be temporarily stopped even during the execution of the application. This may result in a reduction of power consumption caused by operating the gesture engine.

Figure 8A:
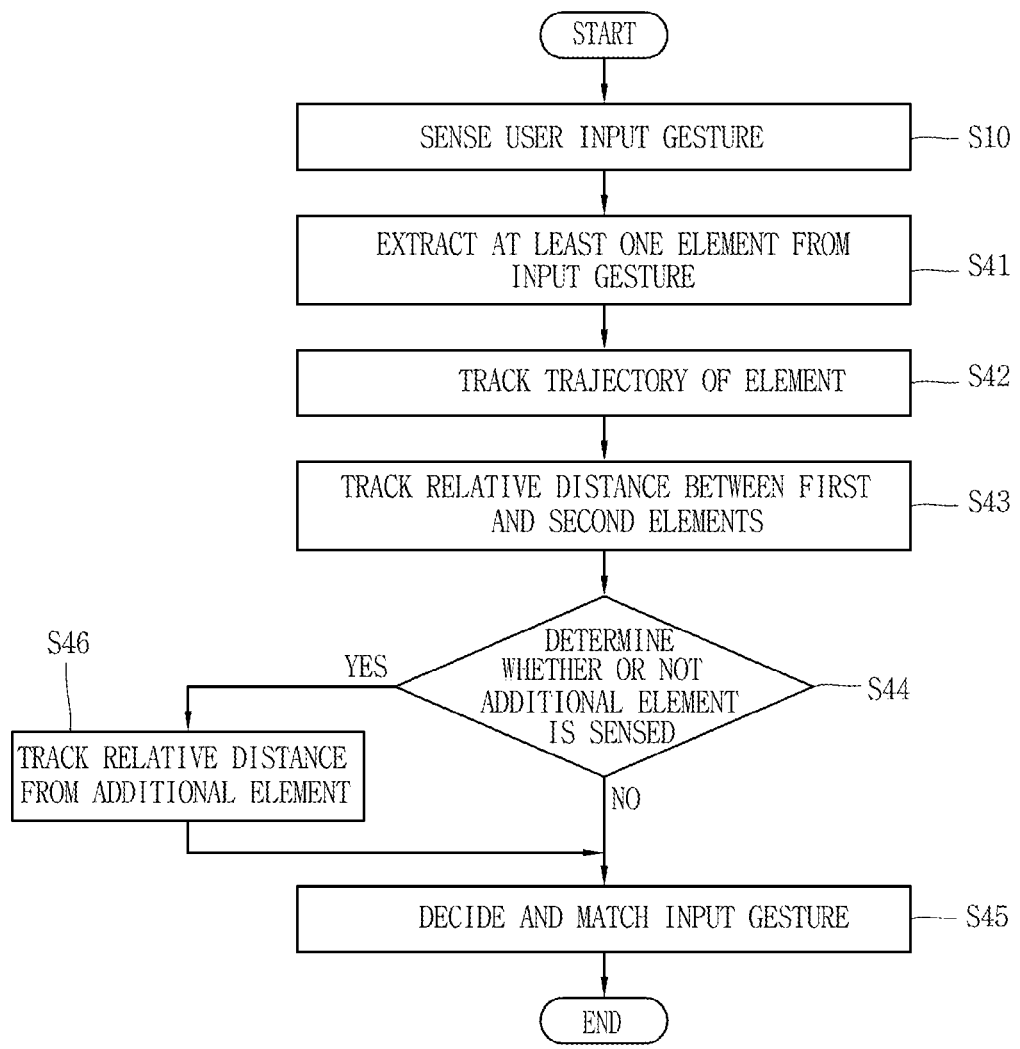
FIG. 8A is a flowchart illustrating a method for controlling an image display device by a continuously-input gesture.
Figure 8B:
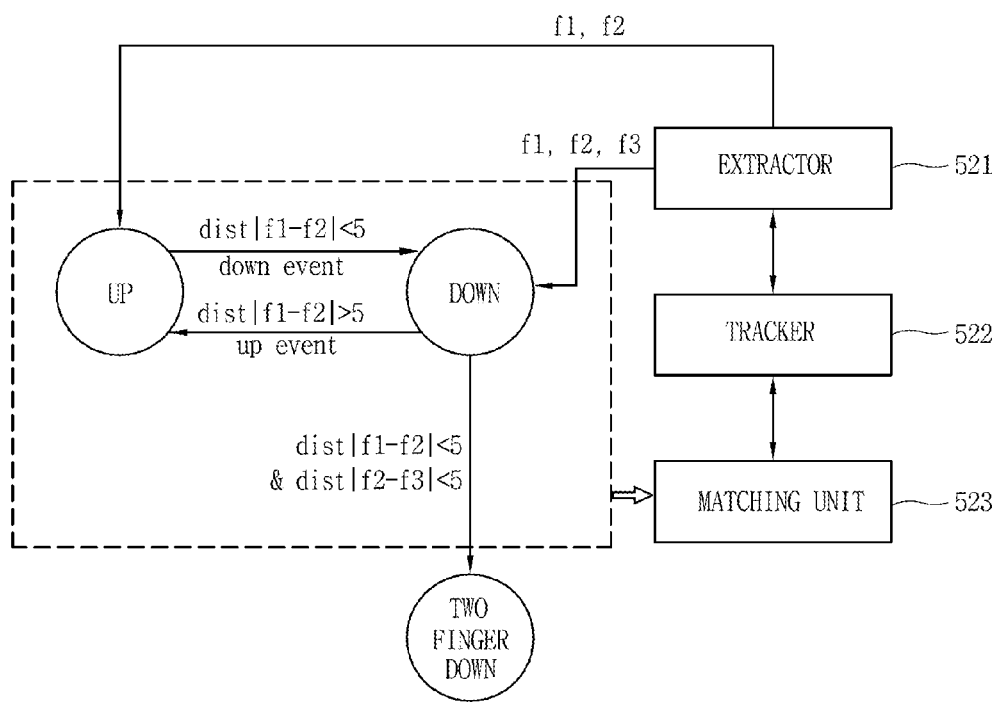
FIGS. 8B and 8C are conceptual views illustrating the control method of FIG. 8A.

FIG. 8A is a flowchart illustrating a method for controlling an image display device by a continuously-input gesture, and FIG. 8B is a conceptual view illustrating the control method of FIG. 8A.

When the sensing unit 510 senses the user's input gesture (S10), the extractor 521 (see FIG. 5) extracts at least one element of the input gesture (S41). The tracker 522 (see FIG. 5) tracks a trajectory of the element (S42).

When the control gesture information is collected from the executed data of the application, the matching unit 523 may recognize a detailed shape of the at least one element. For example, a distance between the first and second elements can be tracked (S43).

Figure 8C:
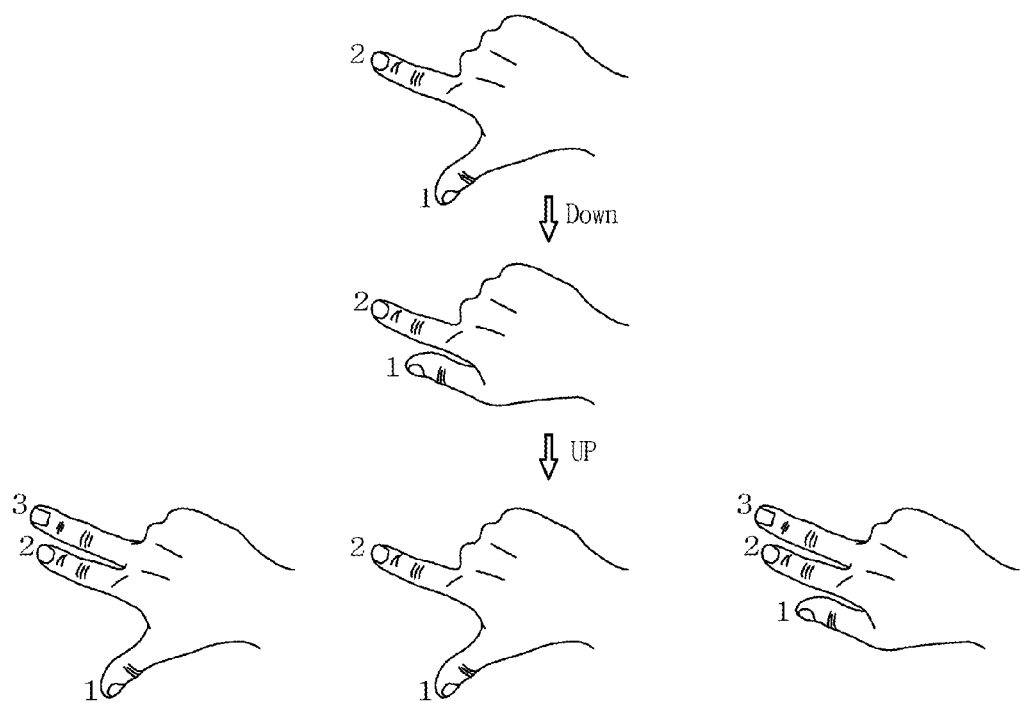

Hereinafter, description will be given of a control method of generating a control signal corresponding to an input gesture including moving elements by use of the distance between the extracted elements, with reference to FIGS. 8B and 8C. When first and second elements f1 and f2 are extracted, the matching unit 523 determines it as an up control signal UP. For example, the up control signal UP may generate an event, such as moving up screen information output on the display unit, moving up an image on a game application, increasing a volume or the like.

Here, the matching unit 523 changes the up control signal into a down control signal DOWN when the distance between the first and second elements f1 and f2 is shorter than a preset distance (as illustrated, the preset distance may correspond to 5). On the other hand, the matching unit 523 changes the down control signal DOWN back into the up control signal UP when the distance between the first and second elements f1 and f2 is tracked greater than the preset distance because of the movements of the elements f1 and f2.

The matching unit 523 determines whether or not an additional element is sensed (S44). When any additional element is not sensed any more, the matching unit 523 decides the input gesture.

On the other hand, when an additional element is sensed, the matching unit 523 decides the input gesture by measuring a distance from the additional element (S46). For example, when a third element f3 is additionally sensed, the matching unit 523 may decide the up control signal UP when the distance between the first and second elements f1 and f2 is greater than the preset distance.

Meanwhile, when the third element is sensed and both a distance between the first and second elements and a distance between the second and third elements are all shorter than the preset distance, the matching unit 523 may decide a control signal as a double down control signal TWO FINGER DOWN.

Here, the basis of deciding the control signal according to the distance between the elements is included in the control gesture information. Accordingly, the matching unit 523 may decide control signals for the moving elements and the additional element based on text included in the control gesture information.

Figure 9B:
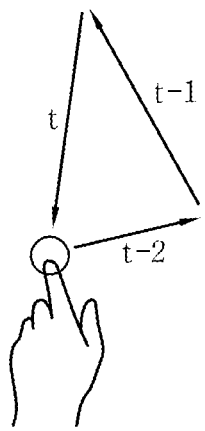
FIG. 9B is a view illustrating input gestures each moving at a different speed.

FIG. 9A is a view illustrating control gesture information including information related to speed in accordance with one exemplary embodiment, and FIG. 9B is a view illustrating input gestures each moving at a different speed.

The control gesture information defines an input gesture in a triangular shape. An end position of a linear vector and a start position of a previous linear vector should meet by the text indicating the triangle. That is, the control gesture information includes text indicating that a distance between an end of a movement t and a movement t−2 is 0. Also, the control gesture information defines an allowable tolerance as 0.3 and designates an operating range (duration) as 500.

In this manner, when elements move, the control gesture information may include text describing moving shapes (patterns) of the elements, and information relating to vector information and accuracy that the elements move.

A developer of an application can generate more various control signals using gestures, which results from individual control gesture information included in executed data of each application. Also, distinctive gestures can provide the user with more exciting applications.

The image display device and the control method thereof may not be limited to the configurations and methods of the described embodiments, but such embodiments may be configured by a selective combination of all or part of the embodiments so as to implement many variations.

INDUSTRIAL AVAILABILITY

Those embodiments disclosed herein illustrate a control of an application using an input gesture when each application is activated by using control gesture information preset in the application, and thus can be applied to various associated industrial fields.

The invention claimed is:

1. An image display device comprising:
   a sensor that is configured to sense a user's input gesture;
   a display that is configured to output visual information among executed data of an application when the application is executed;
   a controller that is configured to:
      collect control gesture information included in the executed data; and
      execute an event of the application which is included in the executed data and corresponds to the control gesture information when the control gesture information and the input gesture sensed by the sensor match each other while the application is executed, and
   wherein the controller is configured to:
      control the display to change the visual information to another visual information in response to the input gesture; and
      deactivate the sensor for stopping the control by the input gesture when the another visual information includes the reproducing video data.

2. The device of claim 1, wherein the controller is configured to:
   extract an element forming the input gesture;
   track a moving trajectory of the extracted element; and
   compare an input gesture with the control gesture information, the input gesture defined by the element and the moving trajectory of the element.

3. The device of claim 2, wherein the control gesture information includes a text, and a control signal associated with the event, the text including at least one of a number of the element, a moving direction of the element, distance information between a plurality of elements, a moving time of the element, and a moving shape of the element.

4. The device of claim 3, wherein the control gesture information includes a preset condition corresponding to a control command for deactivating or reactivating a sensing operation of the input gesture.

5. The device of claim 4, wherein the control gesture information includes a preset condition to ignore the input gesture.

6. The device of claim 2, wherein the element is based on text forming the collected control gesture information.

7. The device of claim 1, wherein the controller stops the matching between the input gesture and the control gesture information when the application is terminated.

8. The device of claim 7, wherein the controller generates a preset control command to correspond to the input gesture based on the input gesture when the application is terminated.

9. A method for controlling an image display device, the method comprising:
   sensing, by a sensor, a user's input gesture;
   receiving executed data of an application when the application is executed;
   collecting control gesture information corresponding to an event of the application among the executed data;
   comparing the control gesture information with the input gesture while the application is executed;
   generating the event when the control gesture information and the input gesture match each other;
   changing the visual information to another visual information based on the event; and
   deactivating the sensor for stopping the control by the input gesture when the another visual information includes the reproducing video data.

10. The method of claim 9, wherein the comparing of the control gesture information with the input gesture while the application is executed comprises:
    extracting elements of the input gesture;
    tracking down trajectories of the elements; and
    sensing a change in a distance between the elements.

* * * * *